US012035137B2

United States Patent
Kunz et al.

(10) Patent No.: US 12,035,137 B2
(45) Date of Patent: Jul. 9, 2024

(54) SECURITY MODE INTEGRITY VERIFICATION

(71) Applicant: Lenovo (Singapore) PTE. LTD., New Tech Park (SG)

(72) Inventors: Andreas Kunz, Ladenburg (DE); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/953,183

(22) Filed: Sep. 26, 2022

(65) Prior Publication Data

US 2023/0020994 A1   Jan. 19, 2023

Related U.S. Application Data

(63) Continuation of application No. 16/812,100, filed on Mar. 6, 2020, now Pat. No. 11,457,360.

(Continued)

(51) Int. Cl.
  *H04W 12/106* (2021.01)
  *H04L 9/08* (2006.01)
  *H04W 12/06* (2021.01)

(52) U.S. Cl.
  CPC ......... *H04W 12/106* (2021.01); *H04L 9/0891* (2013.01); *H04W 12/06* (2013.01)

(58) Field of Classification Search
  CPC ... H04W 12/106; H04W 12/06; H04W 48/20; H04W 12/08; H04W 12/35; H04W 12/02;

(Continued)

(56) References Cited

U.S. PATENT DOCUMENTS 10,362,481 B2 *  7/2019  Green .................... H04W 12/06
11,140,157 B1 * 10/2021  Xia ...................... H04L 63/0853
(Continued)

FOREIGN PATENT DOCUMENTS

EP    4243454 A1 *  9/2023  ......... H04L 63/0281
WO  2016028559 A1    2/2016
(Continued)

OTHER PUBLICATIONS

Huawei, Hisilicon, "Key issue on Authentication relay attack", 3GPP TSG SA WG3 (Security) Meeting #93 83-183470, Nov. 12-16, 2018, pp. 1-3.
(Continued)

*Primary Examiner* — Christopher A Revak
(74) *Attorney, Agent, or Firm* — Kunzler Bean & Adamson

(57) ABSTRACT

Apparatuses, methods, and systems are disclosed for security mode integrity verification. One method includes receiving an authentication request message corresponding to a user equipment. The method includes, in response to receiving the authentication request message, determining whether the user equipment has moved from a first public land mobile network to a second public land mobile network within a predetermined period of time. The method includes, in response to the user equipment having moved from the first public land mobile network to the second public land mobile network within the predetermined period of time, determining a likelihood factor that indicates a likelihood that the user equipment moved from the first public land mobile network to the second public land mobile network. The method includes, in response to the likelihood factor being less than a predetermined threshold, transmitting an authentication response message indicating a failed authentication.

12 Claims, 8 Drawing Sheets

Related U.S. Application Data

(60) Provisional application No. 62/816,024, filed on Mar. 8, 2019.

(58) Field of Classification Search
CPC ............... H04L 9/0891; H04L 63/0892; H04L 63/0428; H04L 63/0442; G06F 21/6245
See application file for complete search history.

(56) References Cited

U.S. PATENT DOCUMENTS

| | | | |
|---|---|---|---|
| 11,178,156 B2* | 11/2021 | Pegg | H04L 63/0876 |
| 2008/0076413 A1* | 3/2008 | Jones | H04L 63/102 |
| | | | 455/432.3 |
| 2011/0216692 A1* | 9/2011 | Lundsgaard | H04W 48/20 |
| | | | 370/328 |
| 2015/0256993 A1* | 9/2015 | Bellamkonda | H04W 8/12 |
| | | | 455/433 |
| 2015/0381633 A1* | 12/2015 | Grim | H04L 63/0861 |
| | | | 726/4 |
| 2016/0157101 A1 | 6/2016 | Do et al. | |
| 2016/0316373 A1 | 10/2016 | Gupta et al. | |
| 2017/0026832 A1 | 1/2017 | Chang et al. | |
| 2017/0195882 A1 | 7/2017 | Liao et al. | |
| 2018/0013568 A1 | 1/2018 | Muhanna et al. | |
| 2018/0227302 A1 | 8/2018 | Lee et al. | |
| 2018/0367998 A1 | 12/2018 | Kunz et al. | |
| 2019/0073676 A1* | 3/2019 | Wang | H04W 4/029 |
| 2019/0342298 A1* | 11/2019 | Chen | H04W 12/66 |
| 2020/0106624 A1* | 4/2020 | Russell | H04W 12/37 |
| 2020/0236682 A1* | 7/2020 | Quan | H04W 72/53 |
| 2022/0108000 A1* | 4/2022 | Wetsel | G06F 21/44 |
| 2023/0092487 A1* | 3/2023 | Kalbasi | H04W 12/61 |
| | | | 455/411 |

FOREIGN PATENT DOCUMENTS

| | | |
|---|---|---|
| WO | 2020178632 A1 | 9/2020 |
| WO | 2021245629 A1 | 12/2021 |

OTHER PUBLICATIONS

3GPP, "3rd Generation Partnership Project; Technical Specification Group Services and System Aspects; Security architecture and procedures for 5G system (Release 15)", 3GPP TS 33.501 V15.3.1, Dec. 2018, pp. 1-181.

3GPP, "3rd Generation Partnership Project; Technical Specification Group Services and System Aspects; Study on 5G Security Enhancement against False Base Stations (Release 16)", 3GPP TR 33.809 V0.2.0, Feb. 2019, pp. 1-16.

3GPP, "3rd Generation Partnership Project; Technical Specification Group Services and System Aspects; Universal Geographical Area Description (GAD) (Release 15)", 3GPP TS 23.032 V15.1.0, Sep. 2018, pp. 1-32.

J. Meyer, "A Man-in-the-Middle Attack on UMTS", ACM, Oct. 1, 2004, pp. 1-8.

Anonymous, "EMM Procedure 1. Initial Attach Part 2. Call Flow of Initial Attach", Netmanias, NMC Consulting Group, www.netmanias.com. Jan. 16, 2014, pp. 1-25.

20724182.9-1218, "Office Action", European Patent Office, dated Apr. 28, 2023, pp. 1-5.

* cited by examiner

SECURITY MODE INTEGRITY VERIFICATION

CROSS-REFERENCE TO RELATED APPLICATIONS

This application is a Continuation Application of U.S. patent Ser. No. 16/812,100, which claims priority to U.S. Patent Application Ser. No. 62/816,024 entitled "FALSE BASE STATION AUTHENTICATION RELAY DETECTION WITH VICTIM AND MALICIOUS UES LOCATED IN DIFFERENT PLMNS" and filed on Mar. 8, 2019 for Andreas Kunz, which is incorporated herein by reference in its entirety.

FIELD

The subject matter disclosed herein relates generally to wireless communications and more particularly relates to security mode integrity verification.

BACKGROUND

The following abbreviations are herewith defined, at least some of which are referred to within the following description: Third Generation Partnership Project ("3GPP"), $5^{th}$ Generation ("5G"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Access Point ("AP"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFT 5"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2-24.25 GHz to 52.6 GHz ("FR2"), Universal Geographical Area Description ("GAD"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NS SF"), Network Slice Selection Policy ("NS SP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Sidelink Control Channel ("PSCCH"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Subcarrier Spacing ("SCS"), Service Data Unit ("SDU"), Security Anchor Function ("SEAF"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink SSB ("S-SSB"), Synchronization Signal Block ("SSB"), Subscription Concealed Identifier ("SUCI"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, a false base station may authenticate a user equipment.

BRIEF SUMMARY

Methods for security mode integrity verification are disclosed. Apparatuses and systems also perform the functions of the methods. One embodiment of a method includes receiving the authentication request message, determining whether the user equipment has moved from a first public land mobile network to a second public land mobile network within a predetermined period of time. The method includes, in response to the user equipment having moved from the first public land mobile network to the second public land mobile network within the predetermined period of time, determining a likelihood factor that indicates a likelihood that the user equipment moved from the first public land mobile network to the second public land mobile network. The method includes, in response to the likelihood factor being less than a predetermined threshold, transmitting an authentication response message indicating a failed authentication.

One apparatus for security mode integrity verification includes transmitter, a processor, and a receiver that receives an authentication request message corresponding to a user equipment. In response to receiving the authentication request message, the processor determines whether the user equipment has moved from a first public land mobile network to a second public land mobile network within a predetermined period of time. The processor, in response to the user equipment having moved from the first public land mobile network to the second public land mobile network within the predetermined period of time, determines a likelihood factor that indicates a likelihood that the user equipment moved from the first public land mobile network to the second public land mobile network. The transmitter, in response to the likelihood factor being less than a predetermined threshold, transmits an authentication response message indicating a failed authentication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
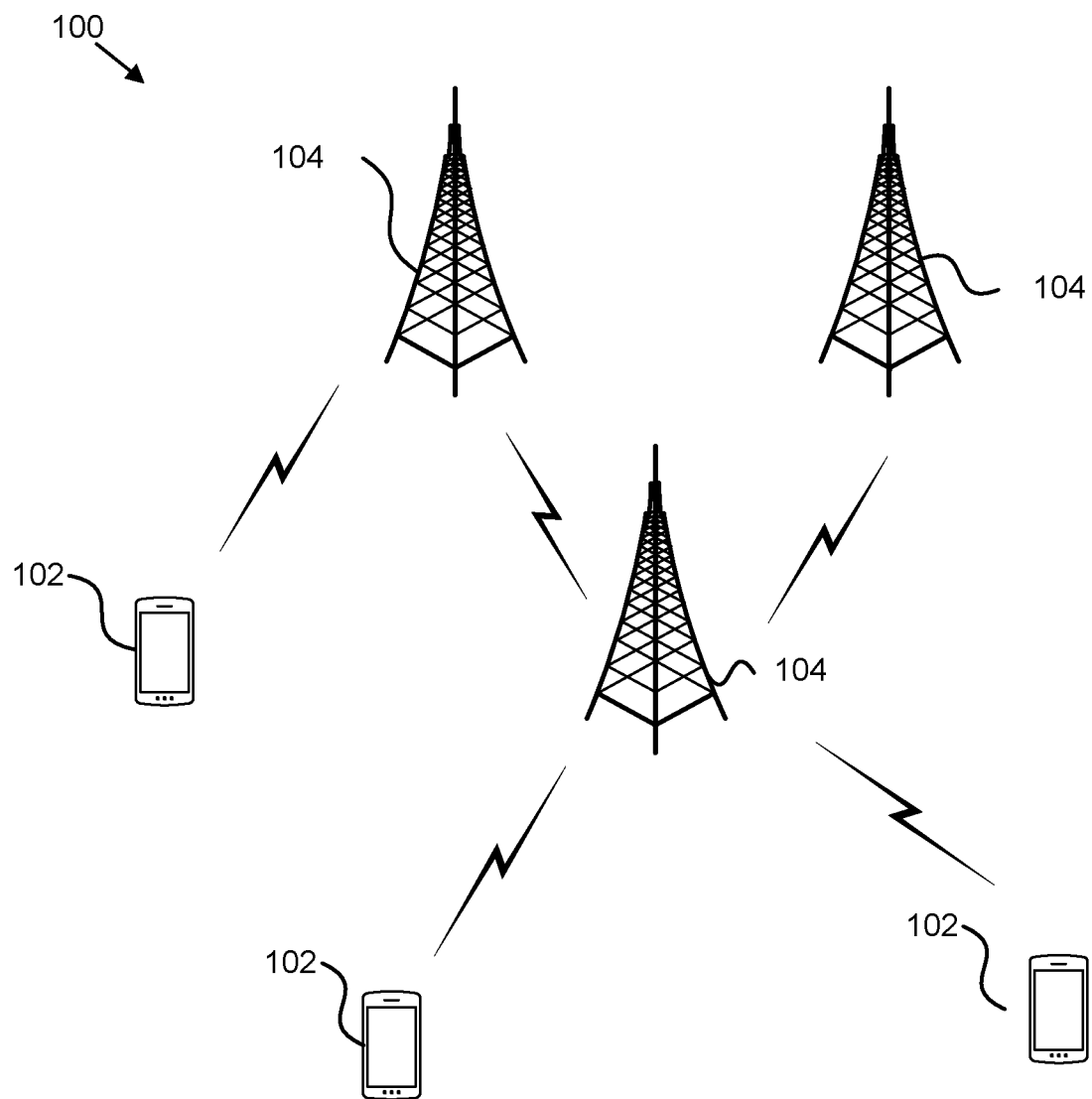
FIG. 1 is a schematic block diagram illustrating one embodiment of a wireless communication system for security mode integrity verification.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for security mode integrity verification. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may transmit a request message to one or more network devices (e.g., network unit 104). In some embodiments, the remote unit 102 may, in response to transmitting the request message, authenticate with the one or more network devices. In certain embodiments, the remote unit 102 may, in response to successfully authenticating with the one or more network devices, receive a security mode command message. In various embodiments, the remote unit 102 may verify the integrity of the security mode command message. In some embodiments, the remote unit 102 may, in response to the verification of the integrity of the security mode command message indicating that a security key is invalid, perform a cell reselection procedure. Accordingly, the remote unit 102 may be used for security mode integrity verification.

In various embodiments, a network unit 104 may receive a request message corresponding to a user equipment (e.g., remote unit 102). In some embodiments, the network unit 104 may, in response to receiving the request message, determine whether the request message is valid based on information corresponding to the user equipment. In certain embodiments, the network unit 104 may, in response to determining that the request message is invalid, transmit a response message indicating to the user equipment that the request message is rejected. Accordingly, the network unit 104 may be used for security mode integrity verification.

In certain embodiments, a network unit 104 may receive an authentication request message corresponding to a user equipment (e.g., remote unit 102). In some embodiments, the network unit 104 may, in response to receiving the authentication request message: determine whether the user equipment has moved from a first public land mobile network to a second public land mobile network within a predetermined period of time; in response to the user equipment having moved from the first public land mobile network to the second public land mobile network within the predetermined period of time, determining a likelihood factor that indicates a likelihood that the user equipment moved from the first public land mobile network to the second public land mobile network; and, in response to the likelihood factor being less than a predetermined threshold, transmitting an authentication response message indicating a failed authentication. Accordingly, the network unit 104 may be used for authentication.

Figure 2:
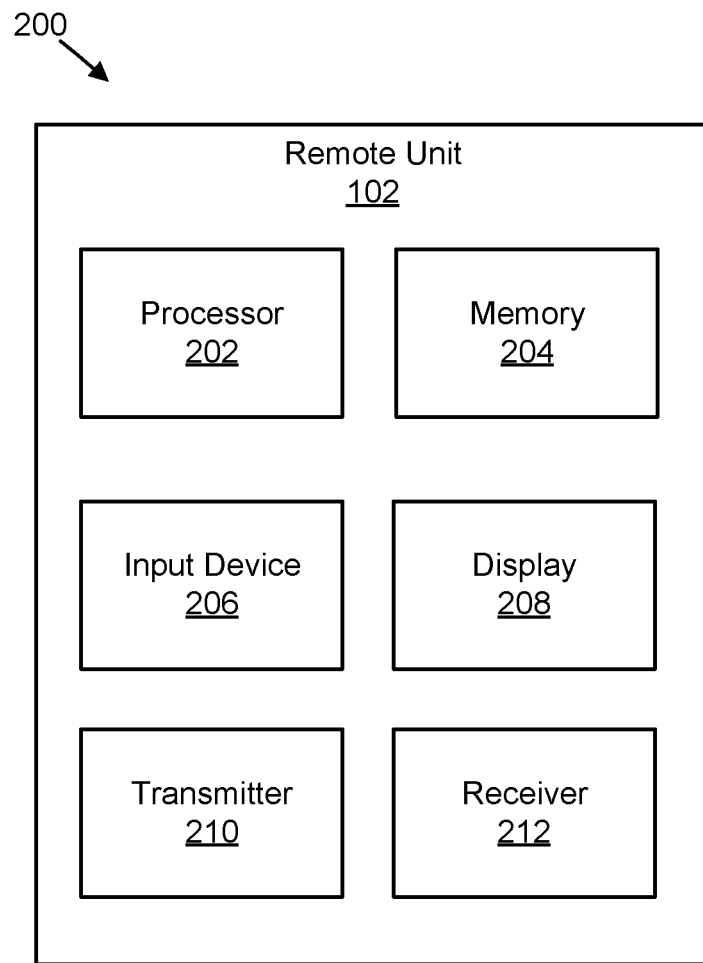
FIG. 2 is a schematic block diagram illustrating one embodiment of an apparatus that may be used for security mode integrity verification.

FIG. 2 depicts one embodiment of an apparatus 200 that may be used for security mode integrity verification. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may, in response to transmitting the request message, authenticate with the one or more network devices. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the transmitter 210 may transmit a request message to one or more network devices (e.g., network unit 104). In various embodiments, the receiver 212 may, in response to successfully authenticating with the one or more network devices, receive a security mode command message, wherein the processor 202: verifies the integrity of the security mode command message; and, in response to the verification of the integrity of the security mode command message indicating that a security key is invalid, performs a cell reselection procedure. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
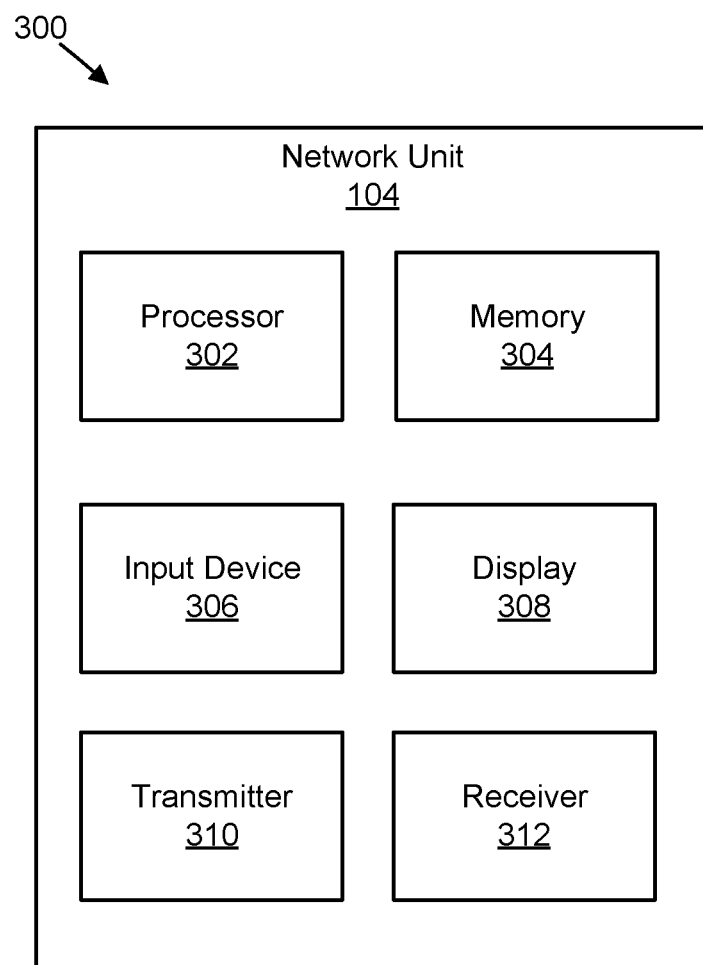
FIG. 3 is a schematic block diagram illustrating one embodiment of an apparatus that may be used for security mode integrity verification.

FIG. 3 depicts one embodiment of an apparatus 300 that may be used for security mode integrity verification. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may receive a request message corresponding to a user equipment (e.g., remote unit 102). In certain embodiments, the processor 302 may, in response to receiving the request message, determine whether the request message is valid based on information corresponding to the user equipment. In various embodiments, the transmitter 310 may, in response to determining that the request message is invalid, transmit a response message indicating to the user equipment that the request message is rejected.

In some embodiments, the receiver 312 may receive an authentication request message corresponding to a user equipment (e.g., remote unit 102), wherein, in response to receiving the authentication request message: the processor 302 may determine whether the user equipment has moved from a first public land mobile network to a second public land mobile network within a predetermined period of time; the processor 302 may, in response to the user equipment having moved from the first public land mobile network to the second public land mobile network within the predetermined period of time, determine a likelihood factor that indicates a likelihood that the user equipment moved from the first public land mobile network to the second public land mobile network; and the transmitter 310 may, in response to the likelihood factor being less than a predetermined threshold, transmit an authentication response message indicating a failed authentication. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
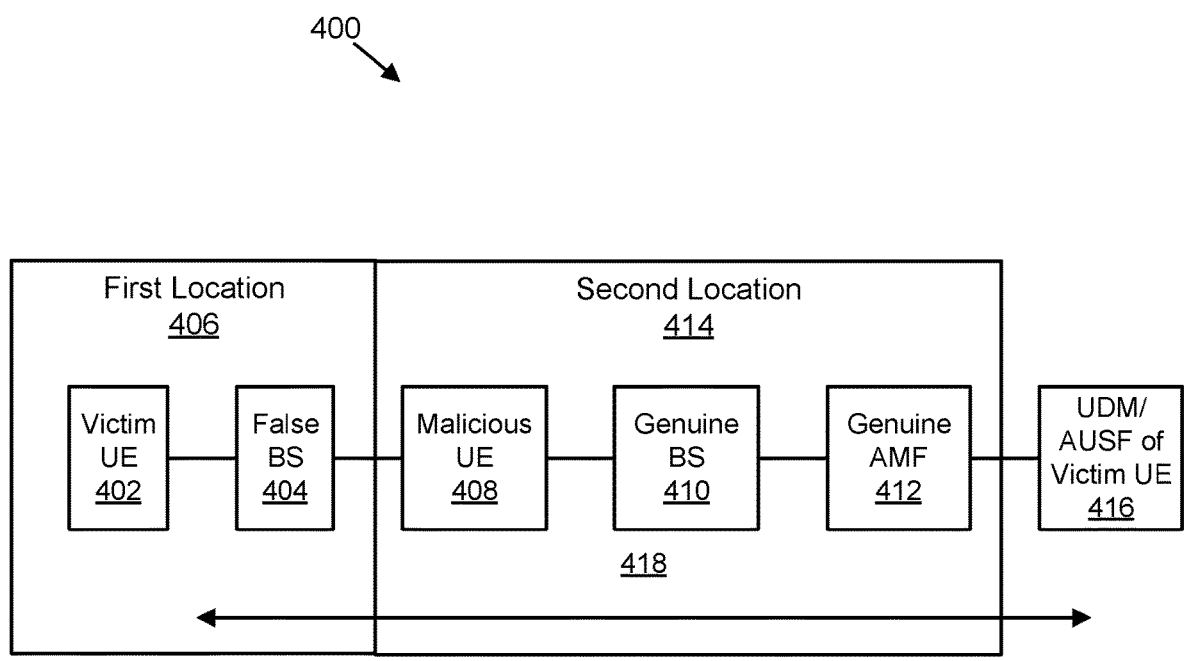
FIG. 4 is a schematic block diagram illustrating one embodiment of an authentication relay attack.

FIG. 4 is a schematic block diagram 400 illustrating one embodiment of an authentication relay attack. The diagram 400 includes a victim UE 402 and a false BS 404 both located at a first location 406, and a malicious UE 408, a genuine BS 410, a genuine AMF 412 all located at a second location 414. The diagram 400 also includes a UDM/AUSF of victim UE 416. The diagram 400 illustrates an authentication attack 418 that occurs across the devices.

In certain configurations, the victim UE 402 may be attracted to the false BS 404 (e.g., malicious gNB). In such configurations, the false BS 404 may collaborate with the malicious UE 408. Moreover, there may be a private channel between the false BS 404 and the malicious UE 408. In these configurations, the distance between the false BS 404 and the malicious UE 408 may be very far, and the false BS 404 and the malicious UE 408 may be linked by a LAN or a WAN to form a malicious network through two PLMNs.

In various embodiments, the victim UE 402 may perform a registration request, a service request, or a TAU request procedure. In such embodiments, the false BS 404 may forward a message of the victim UE 402 to the malicious UE 408, and the malicious UE 408 may forward the message to the genuine AMF 412 in a home network through the genuine BS 410 (e.g., remote legitimate gNB). If the AMF 412 initiates an authentication procedure, the false BS 404 and the malicious UE may forward the authentication messages between the remote legitimate gNB and the victim UE 402 to complete authentication. Accordingly, the victim UE 402 may successfully access the genuine BS 410 and register to the home network through the false BS 404 and the malicious UE 408.

In certain embodiments, a network-aware user's location and a user's actual location may be inconsistent. For example, if the user is in London, the attacker forwards the message to the genuine BS 410 located in New York through the false BS 404 and the malicious UE 408, so that the core network considers the user located in New York, providing a way to set up a false alibi or undermine a criminal investigation with false evidence. The victim UE 402 may be directed by an attacker to access the roaming network resulting in a charging fraud.

Unlike a typical man-in-the-middle attack, the adversary in this attack can neither decrypt the encrypted traffic between the victim UE 402 and the core networks, nor can inject valid encrypted traffic unless the service provider blatantly disregards the standard's security recommendations and choose a weak-security context and/or no-security context during connection establishment.

In certain embodiments, the genuine AMF 412 does not store actual location information of a UE, but the location information may be reported by a gNB. Once the UE accesses a malicious gNB, and the attacker adopts an authentication relay attack as described above, an AMF saved current location information of the UE and actual UE location information may be inconsistent, resulting in incorrect location positioning of the UE.

In various embodiments, there may not be a way to: 1) determine at a UE or an AMF that a malicious attack is occurring; or 2) inform the UE and the AMF about an ongoing malicious attack.

As found herein, the term BS may be used for a base station but may also be replaceable by any other radio access node (e.g., BS, eNB, gNB, AP, NR, and so forth). Moreover, embodiments described herein may be applicable also to various types of networks including IEEE 802.11 variants, GSM, GPRS, UMTS, LTE variants, CDMA 2000, Bluetooth, ZigBee, Sigfoxx, and so forth.

In one embodiment, a UE and/or an AMF may detect an ongoing man in the middle attack.

In certain embodiments, a victim UE may use a different 5G-GUTI (e.g., as UE ID in NAS signaling messages) than expected from an actual PLMN of a malicious UE. The malicious UE may filter out those identifiers or the NAS message may be encrypted with a current security context since the victim UE does not know that its message is rerouted to a different destination. This network based solution may look at the plausibility for the victim UE to change geographic locations within a time difference of a timestamp of the last known location in a UDM and a new location forced by the malicious UE.

Figure 5:
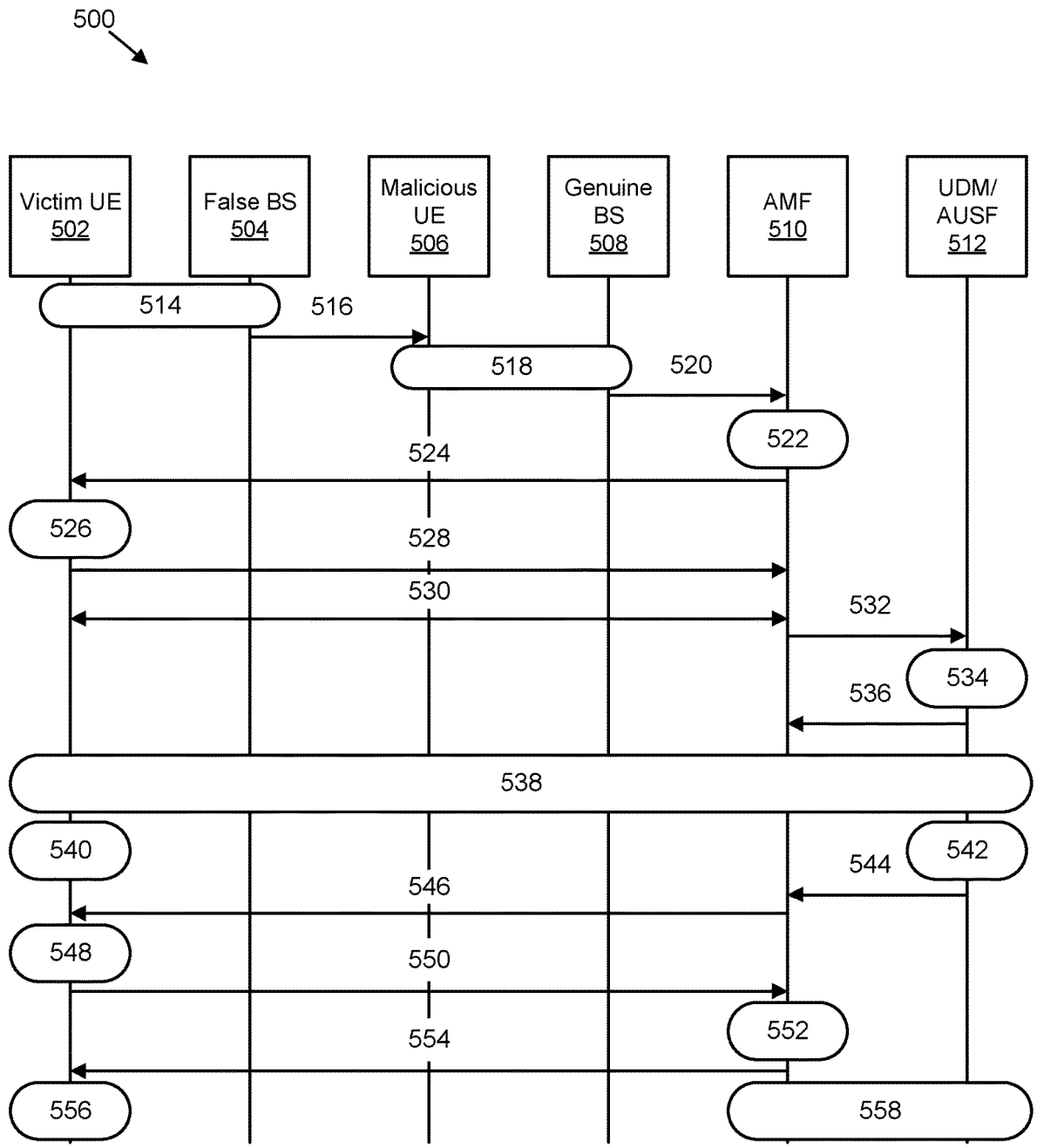
FIG. 5 is a schematic block diagram illustrating one embodiment of network communications.

FIG. 5 is a schematic block diagram illustrating network communications 500. The illustrated communications 500 are between a victim UE 502, a false BS 504, a malicious UE 506, a genuine BS 508, an AMF 510, and a UDM/AUSF 512. The victim UE 502 and the false BS 504 are located at the same general location in a first PLMN, and the malicious UE 506, the genuine BS 508, and the AMF 510 are located at the same general location in a second PLMN. Each of the communications 500 described herein may include one or more messages. The communications 500 may be for an NAS registration or a service request procedure triggered by the victim UE 502.

In one embodiment, in a first communication 514 transmitted between the victim UE 502 and the false BS 504, the victim UE 502 performs an RRC setup procedure with the false BS 504.

In another embodiment, in a second communication 516 transmitted from the false BS 504 to the malicious UE 506, the false BS 504 transmits a message that triggers the malicious UE 506 to the malicious UE 506. The malicious UE 506 may be triggered by a first RRC message, an RRC setup request, and/or an RRC setup complete message. In some embodiments, the malicious UE 506 replaces the victim UE's 502 S-TMSI (e.g., NG-5G-S-TMSI) from an RRC setup request with the malicious UE's 506 S-TMSI, such as in the form of a random string. In various embodiments, an RRC layer uses a random string if there is no S-TMSI provided from upper layers (e.g., an NAS layer).

In certain embodiments, in a third communication 518 transmitted between the malicious UE 506 and the genuine BS 508, the malicious UE 506 performs an RRC setup procedure with the genuine BS 508.

In some embodiments, in a fourth communication 520 transmitted from the genuine BS 508 to the AMF 510, the genuine BS 508 transmits an initial NAS message to the AMF 510. The initial NAS message may include a 5G-GUTI of the first PLMN and/or may be integrity protected.

Once the AMF 510 in the second PLMN receives the initial NAS message (e.g., any suitable NAS message, such as an NAS transport, an uplink NAS transport, a message containing PDU session establishment, authentication, modification, and/or release request, and so forth) forwarded from the malicious UE 506 in the fourth communication 520, the AMF 510 may determine 522 that there is no NAS context (e.g., security, access, and/or mobility context) corresponding to the 5G-GUTI, and the AMF 510 may determine that the 5G-GUTI contains a PLMN ID different from the PLMN ID of the second PLMN. The AMF 510 may not be able to check the integrity protection of the NAS message and may not be able to decipher an NAS container. The victim UE 502 may assume that it is in the same PLMN network that it started in. In certain embodiments, the victim UE 502 may send a message that has a complete initial NAS message ciphered in an NAS container along with cleartext IEs with whole message integrity protected. This initial NAS message may be a service request, a periodic reregistration message, a mobility reregistration message, and/or another message.

If the victim UE 502 would perform PLMN selection (e.g., due to roaming), then the victim UE 502 may send SUCI in an unprotected initial NAS message since it does not have a security context and a valid 5G-GUTI assigned from the PLMN where the victim UE 502 camps. This may be used as a first indication of an authentication relay attack.

If the message received by the AMF 510 is a service request or a registration request, the AMF 510 may reject the request because the victim UE 502 is unknown in the network. In certain embodiments, in a fifth communication 524 transmitted from the AMF 510 to the victim UE 502, the AMF 510 may transmit an NAS message rejection to the victim UE 502. The NAS message rejection may include information indicating that the 5G-GUTI is invalid and/or a PLMN mismatch. The victim UE 502 may detect 526 an error cause, reregister, and/or perform cell reselection. For example, the victim UE 502 may detect implicitly based on the error cause that it is camping at a false BS and may perform cell reselection. The victim UE may internally mark the cell of the false BS as an invalid cell so that it does not go back to it at a later time after performing cell-reselection.

In various embodiments, if the victim UE 502 does not perform cell reselection, in a sixth communication 528 transmitted from the victim UE 502 to the AMF 510, the victim UE 502 itself may initiate an initial registration request with its SUCI and/or UE capabilities via a transmission to the AMF 510. The victim UE 502 may use this as a criteria to recognize the false BS 504 because the victim UE 502 assumes it already has had a successful registration with the current PLMN, replayed by the false BS 504. As a result, in some embodiments, a seventh communication 530 may be skipped.

In certain embodiments, in the seventh communication 530 transmitted between the victim UE 502 and the AMF 510, the AMF 510 of the second PLMN does not know the identity of the victim UE 502, therefore the AMF 510 transmits an identity request to the victim UE 502 and requests SUCI. The identity request is forwarded to the victim UE 502 and the victim UE 502 provides its SUCI to the AMF 510 in an identity reply message.

In some embodiments, in an eighth communication 532 transmitted from the AMF 510 and the UDM/AUSF 512, the AMF 510 sends a Nausf UEAuthentication Authenticate request message to the UDM/AUSF 512 of the HPLMN of the victim UE 502. This request message contains the serving network identifier (e.g., identifier of the second PLMN). To provide the HPLMN with extra location information, the AMF 510 may send the location of the victim UE 502 according to GAD. This information may help the HPLMN to identify a distance between a location of a last registration in the UDM/AUSF 512 and the new location from the AMF 510, as well as the time difference.

In various embodiments, the UDM/AUSF 512 may make 534 a plausibility check to determine whether it is possible to travel from the last known location to the new location within the time that the present registration request occurred. If implemented in the HPLMN, then the HPLMN may deny the authentication request to the AMF 510 with a location mismatch cause value. Alternatively, the UDM/AUSF 512 may provide the last known location of the victim UE 502 including timestamp to the AMF 510 using GAD, and the AMF 510 may make the decision about whether the location differences between the first PLMN and the second PLMN are possible based on corresponding timestamps. This check may be performed in roaming scenarios based on PLMN IDs and in non-roaming scenarios based on tracking area IDs or global cell IDs. The result of this location change evaluation may be a factor in detecting the man in the middle attack.

In some embodiments, in a ninth communication 536 transmitted from the UDM/AUSF 512 to the AMF 510 and, the UDM/AUSF 512 provides a challenge to the AMF 510 (e.g., SEAF, an AKA' challenge, or a 5G serving environment authentication vector such as RAND, AUTN, and/or HXRES*).

In certain embodiments, in a tenth communication 538 between the victim UE 502, the false BS 504, the malicious UE 506, the genuine BS 508, the AMF 510, and/or the UDM/AUSF 512, the UDM/AUSF 512 may perform a normal primary authentication procedure (e.g., 5G AKA or EAP-AKA').

Once the authentication is successful, the victim UE 502 derives 540 and the UDM/AUSF 512 derives 542 $K_S$EAF but with different PLMN IDs as input to the KDF, resulting in two different keys (e.g., one key in the victim UE 502 and one key in the UDM/AUSF 512 i.e. $K_{SEAF1}$ and $K_{SEAF2}$)

In various embodiments, in an eleventh communication 544 transmitted from the UDM/AUSF 512 to the AMF 510, the UDM/AUSF 512 provides the $K_{SEAF2}$ to the AMF 510. The AMF 510 derives a $K_{AMF}$ and NAS keys.

In some embodiments, a successful authentication procedure results in a new $K_S$EAF, which may mean that all derived keys are renewed in the AMF 510 and the victim UE 502. Thus, a security mode command procedure may be carried out after every authentication procedure.

In certain embodiments, in a twelfth communication 546 transmitted from the AMF 510 to the victim UE 502, the AMF 510 sends a security mode command to the victim UE 502. The security mode command may be integrity protected with a key (e.g., $K_{NASint2}$).

Upon reception of the security mode command message, the victim UE 502 may know that the authentication procedure was successful. The victim UE 502 tries 548 to verify the integrity of the security mode command but the victim UE 502 fails due to the key mismatch of $K_{SEAF5}$ and the resulting $K_{NASint}$ keys (e.g., $K_{NASint1}$ is different than $K_{NASint2}$).

Therefore, in various embodiments, in a thirteenth communication 550 transmitted from the victim UE 502 to the AMF 510, the victim UE 502 sends a security mode reject message including an appropriate error cause value (e.g., integrity check failure) to the AMF 510. The victim UE 502 may integrity protect the message (e.g., the security mode reject message) with the victim UE's 502 own derived key $K_{NASinn}$. The AMF 510 may verify 552 whether it was a transmission failure or a key mismatch, and the AMF 510 may determine the NAS key mismatch based on one or more of the following: 1) the AMF 510 receives a security mode reject with the error cause that the victim UE 502 could not verify the integrity of the previously sent security mode command; and/or 2) the AMF 510 may be unable to verify the integrity of the security mode reject from the victim UE 502 (e.g., the AMF 510 may know that victim UE 502 has performed successful authentication).

In some embodiments, in a fourteenth communication 554 transmitted from the AMF 510 to the victim UE 502, the AMF 510 may reject the registration by transmitting a registration reject message to the victim UE 502. The AMF 510 may indicate to the victim UE 502 to re-register after a cell or PLMN reselection in order to allow the victim UE 502 to try from another (e.g., perhaps genuine) cell.

The victim UE 502 may detect 556 the false BS 504 and/or perform cell reselection. The victim UE 502 may internally mark the cell of the false BS 504 as an invalid cell so that it does not go back to it at a later time after performing cell-reselection. Moreover, the AMF 510 may inform 558 the UDM/AUSF 512 about the key mismatch. As may be appreciated, one reason for the key mismatch may be a man in the middle attack. Especially if the AUSF/UDM 512 takes into account the result of the plausibility check in step 534, and if the victim UE 502 changes to a genuine cell and starts an initial registration again.

As described herein, detection of a man in the middle attack may be made with a false base station and a malicious UE in different locations by exchanging location information between UE and AMF.

In various embodiments described herein, an AMF may: 1) provide location information with timestamp in a generic format to the HPLMN of the victim UE so that the AUSF/UDM can make a plausibility check whether it is possible to travel between the two destinations within the given time of the two timestamps of the last known location in the UDM and the location of the malicious UE; 2) checks the last known location information with timestamp in a generic format retrieved from the HPLMN of the victim UE so in order to make a plausibility check whether it is possible to travel between the two destinations within the given time of the two timestamps of the currently occurred request at the AMF; 3) detect NAS key mismatch based on a) integrity check failure reported from the UE (e.g., in the security mode reject message), and b) the fact that the performed primary authentication was successful; 4) send an NAS reject message (e.g. service request and/or registration reject message) to the UE indicating cell and/or PLMN reselection or invalid GUTI (or no UE's context) and/or PLMN mismatch; and/or 5) inform an UDM/AUSF about a NAS key mismatch.

In some embodiments as described herein, a UDM/AUSF may: 1) provides last known location information with timestamp in a generic format to the AMF of the malicious UE so that the AMF can make a plausibility check whether it is possible to travel between the two destinations within the given time of the two timestamps of the last known location in the UDM and the location of the malicious UE; 2) checks the last known location information with timestamp in a generic format retrieved from the AMF of the malicious UE in order to make a plausibility check whether it is possible to travel between the two destinations within the given time of the two timestamps of the currently occurred request at the AMF and the last known location in the UDM of the Victim UE; and/or 3) detect man in the middle attack based on quick PLMN change of the UE and NAS key mismatch error from the AMF.

In certain embodiments as described herein, a UE may: 1) perform successful authentication but experience an integrity check failure of the received security mode command, the UE may send a security mode reject message including an error cause of e.g. integrity check failure, and/or the UE may integrity protect the message with its derived NAS key so that the AMF can verify whether it was a transmission failure or a key mismatch; 2) implicitly and/or internally (e.g., not based on an NAS reject message) determine to perform cell re-selection if a primary authentication is successful, but a security mode command integrity check fails (e.g., due to false BS as man in the middle attach); 3) perform cell reselection after receiving a NAS message reject with an error cause that the 5G-GUTI is invalid, especially if additionally indicated that the PLMN ID is not matching, but the UE had a successful registration before in the PLMN where the false BS is located and is imitating a local BS so that the UE does not recognize a change; 4) implicitly and/or internally (e.g., not based on an NAS reject message) determine to perform cell re-selection if it experiences a time out after sending a security mode reject message dropped by the attacker (e.g., false BS or malicious UE), taking into account a) a security mode command integrity check failure, b) a successful authentication, and/or c) a re-registration or identity request; 5) internally mark a cell of a false BS as an invalid cell so that it does not go back to it at a later time after performing cell-reselection; and/or 6) may use as a criteria to perform cell and/or PLMN reselection (e.g., due to detect false BS) if a service request is rejected or re-registration request is rejected, even the UE assumes to have a valid security context and successful registration with the PLMN.

Figure 6:
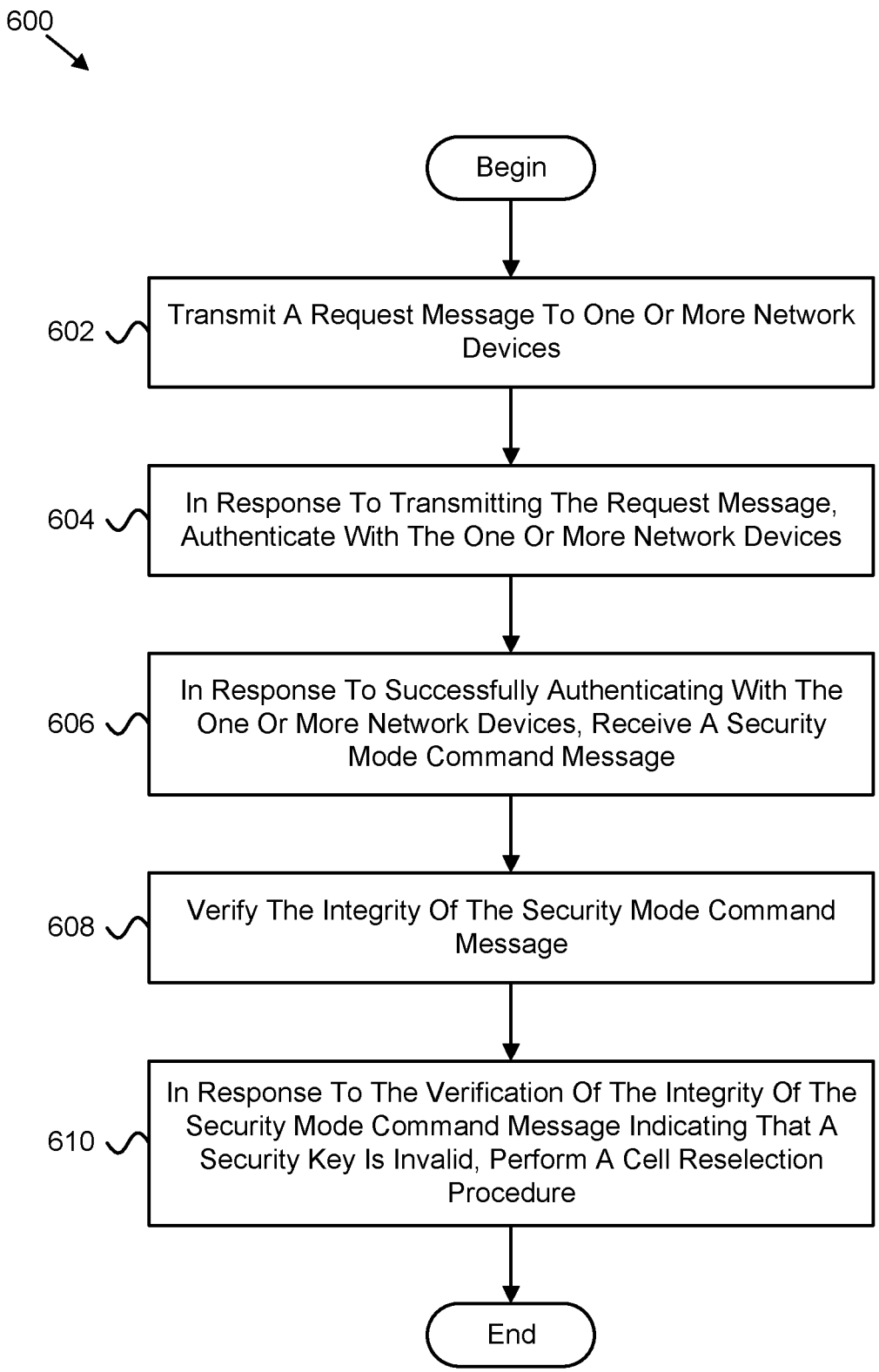
FIG. 6 is a flow chart diagram illustrating one embodiment of a method for security mode integrity verification.

FIG. 6 is a flow chart diagram illustrating one embodiment of a method 600 for security mode integrity verification. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a request message to one or more network devices. In some embodiments, the method 600 includes, in response to transmitting the request message, authenticating 604 with the one or more network devices. In certain embodiments, the method 600 includes, in response to successfully authenticating with the one or more network devices, receiving 606 a security mode command message. In various embodiments, the method 600 includes verifying 608 the integrity of the security mode command message. In some embodiments, the method 600 includes, in response to the verification of the integrity of the security mode command message indicating that a security key is invalid, performing 610 a cell reselection procedure.

In certain embodiments, the method 600 further comprises, in response to the verification of the integrity of the security mode command message indicating that the security key is invalid, transmitting a security mode reject message. In some embodiments, the method 600 further comprises, in response to transmitting the security mode reject message, receiving a registration rejection message.

In various embodiments, the method 600 further comprises, in response to the verification of the integrity of the security mode command message indicating that the security key is invalid, storing information indicating that a cell corresponding to the one or more network devices is an invalid cell. In one embodiment, performing the cell reselection procedure comprises starting an initial registration with a second cell different from a first cell corresponding to the one or more network devices.

Figure 7:
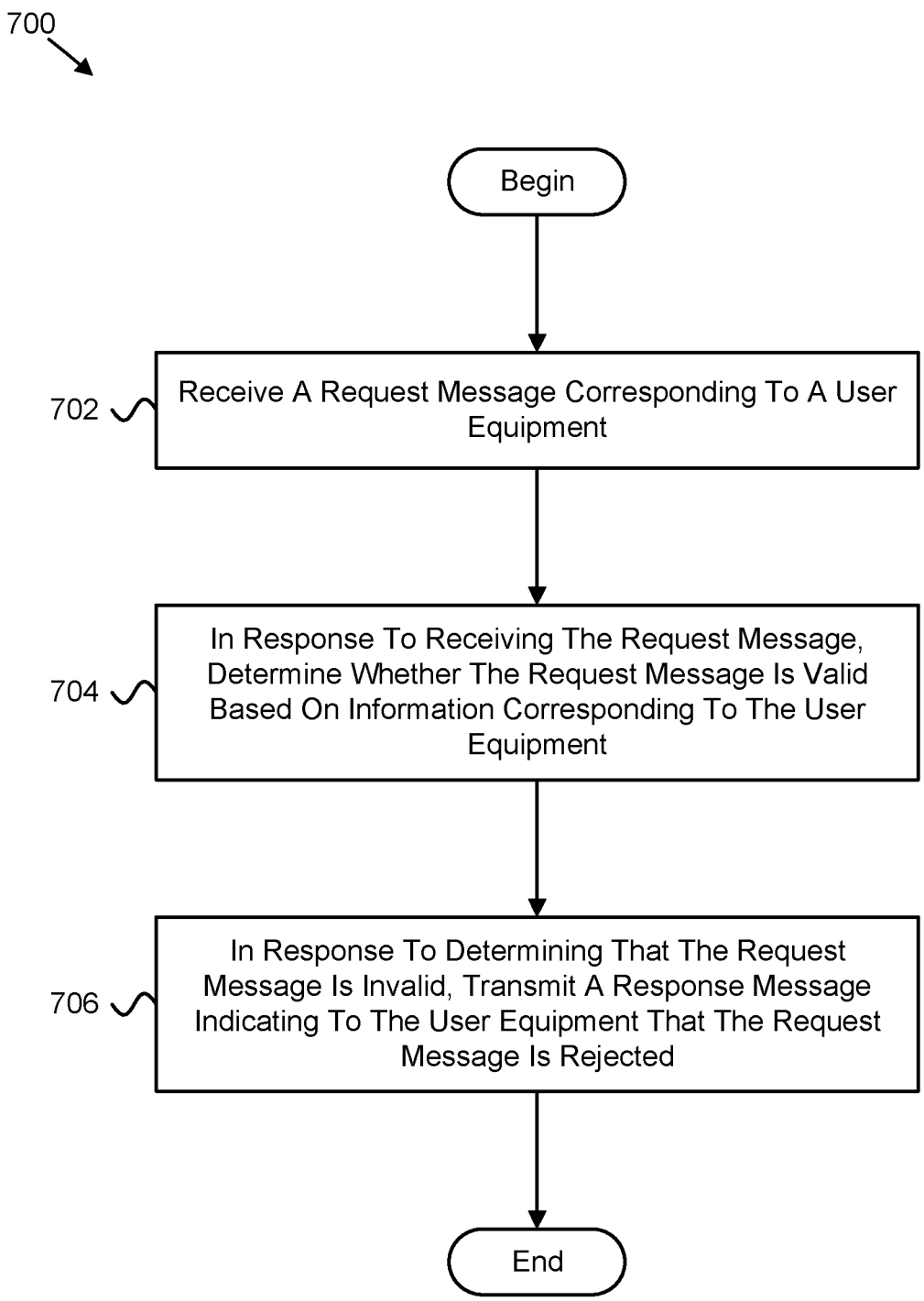
FIG. 7 is a flow chart diagram illustrating another embodiment of a method for security mode integrity verification.

FIG. 7 is a flow chart diagram illustrating another embodiment of a method 700 for security mode integrity verification. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a request message corresponding to a user equipment. In some embodiments, the method 700 includes, in response to receiving the request message, determining 704 whether the request message is valid based on information corresponding to the user equipment. In certain embodiments, the method 700 includes, in response to determining that the request message is invalid, transmitting 706 a response message indicating to the user equipment that the request message is rejected.

In certain embodiments, the request message comprises a network access stratum registration message, a service request message, a radio resource control message, a radio resource control setup request message, or some combination thereof. In some embodiments, the information corresponding to the user equipment comprises a globally unique temporary identifier, a user equipment identifier, or a combination thereof.

In various embodiments, the method 700 further comprises successfully authenticating the user equipment. In one embodiment, the method 700 further comprises receiving a security mode reject message indicating that a security mode command message integrity check performed by the user equipment failed.

Figure 8:
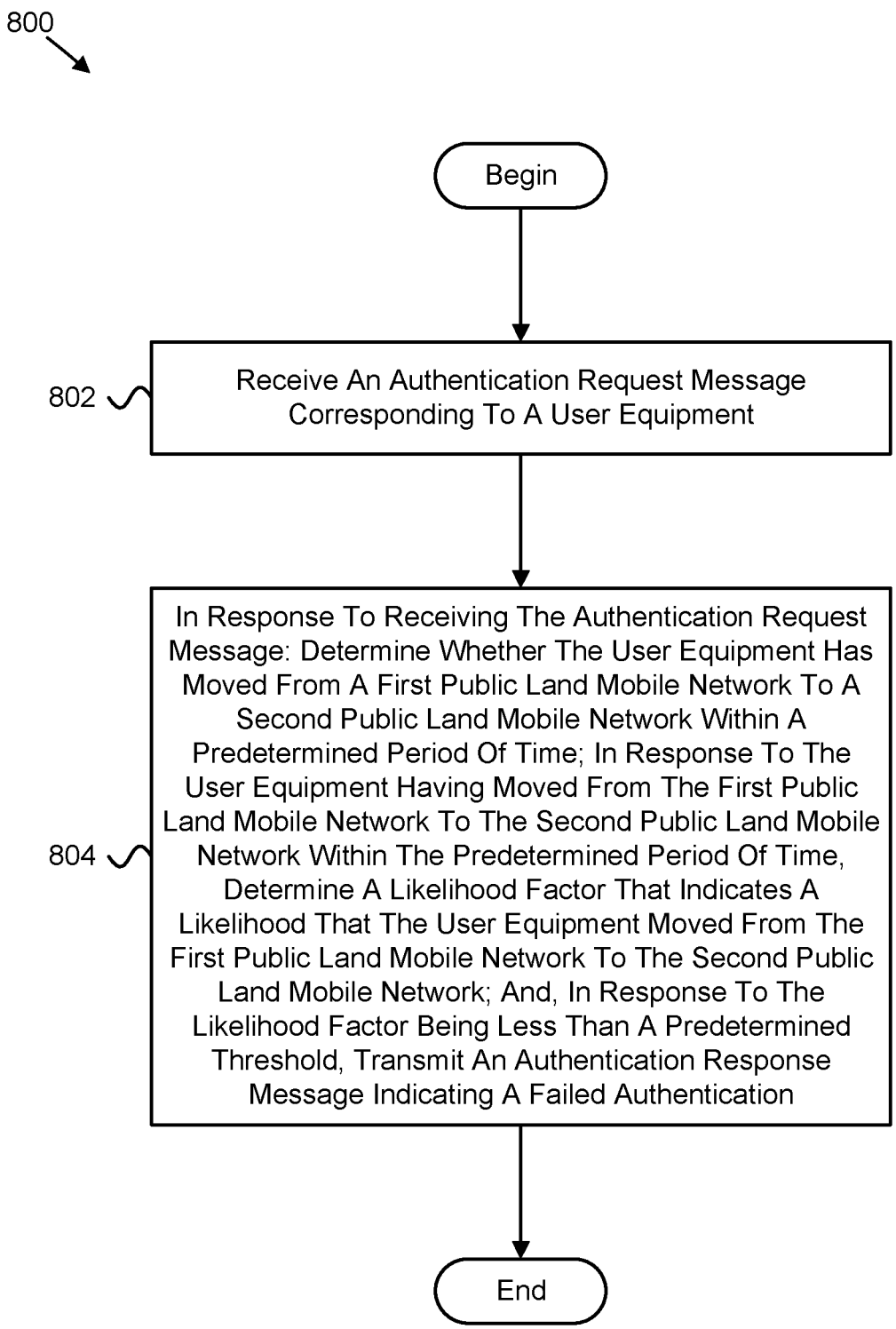
FIG. 8 is a flow chart diagram illustrating one embodiment of a method for authentication.

FIG. 8 is a flow chart diagram illustrating one embodiment of a method 800 for authentication. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 an authentication request message corresponding to a user equipment. In some embodiments, the method 800 includes, in response to receiving the authentication request message: determining 804 whether the user equipment has moved from a first public land mobile network to a second public land mobile network within a predetermined period of time; in response to the user equipment having moved from the first public land mobile network to the second public land mobile network within the predetermined period of time, determining a likelihood factor that indicates a likelihood that the user equipment moved from the first public land mobile network to the second public land mobile network; and, in response to the likelihood factor being less than a predetermined threshold, transmitting an authentication response message indicating a failed authentication.

In certain embodiments, the likelihood factor corresponds to a distance between the first public land mobile network and the second public land mobile network taking into account the predetermined period of time between two registrations corresponding to the first public land mobile network and the second public land mobile network. In some embodiments, the method 800 further comprises receiving information indicating a security key mismatch detected by the user equipment. In various embodiments, the method 800 further comprises setting a parameter to a value indicating a potential security issue in response to receiving the information indicating the security key mismatch detected by the user equipment.

In one embodiment, a method comprises: transmitting a request message to one or more network devices; in response to transmitting the request message, authenticating with the one or more network devices; in response to successfully authenticating with the one or more network devices, receiving a security mode command message; verifying the integrity of the security mode command message; and, in response to the verification of the integrity of the security mode command message indicating that a security key is invalid, performing a cell reselection procedure.

In certain embodiments, the method further comprises, in response to the verification of the integrity of the security mode command message indicating that the security key is invalid, transmitting a security mode reject message.

In some embodiments, the method further comprises, in response to transmitting the security mode reject message, receiving a registration rejection message.

In various embodiments, the method further comprises, in response to the verification of the integrity of the security mode command message indicating that the security key is invalid, storing information indicating that a cell corresponding to the one or more network devices is an invalid cell.

In one embodiment, performing the cell reselection procedure comprises starting an initial registration with a second cell different from a first cell corresponding to the one or more network devices.

In one embodiment, an apparatus comprises: a transmitter that transmits a request message to one or more network devices; a processor that, in response to transmitting the request message, authenticates with the one or more network devices; and a receiver that, in response to successfully authenticating with the one or more network devices, receives a security mode command message, wherein the processor: verifies the integrity of the security mode command message; and, in response to the verification of the integrity of the security mode command message indicating that a security key is invalid, performs a cell reselection procedure.

In certain embodiments, the transmitter, in response to the verification of the integrity of the security mode command message indicating that the security key is invalid, transmits a security mode reject message.

In some embodiments, the receiver, in response to transmitting the security mode reject message, receives a registration rejection message.

In various embodiments, the processor, in response to the verification of the integrity of the security mode command message indicating that the security key is invalid, stores information indicating that a cell corresponding to the one or more network devices is an invalid cell.

In one embodiment, the processor performing the cell reselection procedure comprises the processor starting an initial registration with a second cell different from a first cell corresponding to the one or more network devices.

In one embodiment, a method comprises: receiving a request message corresponding to a user equipment; in response to receiving the request message, determining whether the request message is valid based on information corresponding to the user equipment; and, in response to determining that the request message is invalid, transmitting a response message indicating to the user equipment that the request message is rejected.

In certain embodiments, the request message comprises a network access stratum registration message, a service request message, a radio resource control message, a radio resource control setup request message, or some combination thereof.

In some embodiments, the information corresponding to the user equipment comprises a globally unique temporary identifier, a user equipment identifier, or a combination thereof.

In various embodiments, the method further comprises successfully authenticating the user equipment.

In one embodiment, the method further comprises receiving a security mode reject message indicating that a security mode command message integrity check performed by the user equipment failed.

In one embodiment, an apparatus comprises: a receiver that receives a request message corresponding to a user equipment; a processor that, in response to receiving the request message, determines whether the request message is valid based on information corresponding to the user equipment; and a transmitter that, in response to determining that the request message is invalid, transmits a response message indicating to the user equipment that the request message is rejected.

In certain embodiments, the request message comprises a network access stratum registration message, a service request message, a radio resource control message, a radio resource control setup request message, or some combination thereof.

In some embodiments, the information corresponding to the user equipment comprises a globally unique temporary identifier, a user equipment identifier, or a combination thereof.

In various embodiments, the processor successfully authenticates the user equipment.

In one embodiment, the receiver receives a security mode reject message indicating that a security mode command message integrity check performed by the user equipment failed.

In one embodiment, a method comprises: receiving an authentication request message corresponding to a user equipment; and in response to receiving the authentication request message: determining whether the user equipment has moved from a first public land mobile network to a second public land mobile network within a predetermined period of time; in response to the user equipment having moved from the first public land mobile network to the second public land mobile network within the predetermined period of time, determining a likelihood factor that indicates a likelihood that the user equipment moved from the first public land mobile network to the second public land mobile network; and, in response to the likelihood factor being less than a predetermined threshold, transmitting an authentication response message indicating a failed authentication.

In certain embodiments, the likelihood factor corresponds to a distance between the first public land mobile network and the second public land mobile network taking into account the predetermined period of time between two registrations corresponding to the first public land mobile network and the second public land mobile network.

In some embodiments, the method further comprises receiving information indicating a security key mismatch detected by the user equipment.

In various embodiments, the method further comprises setting a parameter to a value indicating a potential security issue in response to receiving the information indicating the security key mismatch detected by the user equipment.

In one embodiment, an apparatus comprises: a transmitter; a processor; and a receiver that receives an authentication request message corresponding to a user equipment, wherein, in response to receiving the authentication request message: the processor determines whether the user equipment has moved from a first public land mobile network to a second public land mobile network within a predetermined period of time; the processor, in response to the user equipment having moved from the first public land mobile network to the second public land mobile network within the predetermined period of time, determines a likelihood factor that indicates a likelihood that the user equipment moved from the first public land mobile network to the second public land mobile network; and the transmitter, in response to the likelihood factor being less than a predetermined threshold, transmits an authentication response message indicating a failed authentication.

In certain embodiments, the likelihood factor corresponds to a distance between the first public land mobile network and the second public land mobile network taking into account the predetermined period of time between two registrations corresponding to the first public land mobile network and the second public land mobile network.

In some embodiments, the receiver receives information indicating a security key mismatch detected by the user equipment.

In various embodiments, the processor sets a parameter to a value indicating a potential security issue in response to the receiver receiving the information indicating the security key mismatch detected by the user equipment.

In various embodiments, a method comprising receiving an authentication request message corresponding to a user equipment and in response to receiving the authentication request message determining whether the user equipment has moved from a first public land mobile network to a second public land mobile network within a predetermined period of time. In response to the user equipment having moved from the first public land mobile network to the second public land mobile network within the predetermined period of time, determining a likelihood factor that indicates a likelihood that the user equipment moved from the first public land mobile network to the second public land mobile network. In response to the likelihood factor being less than a predetermined threshold, transmitting an authentication response message indicating a failed authentication.

In some embodiments, the likelihood factor corresponds to a distance between the first public land mobile network and the second public land mobile network taking into account the predetermined period of time between two registrations corresponding to the first public land mobile network and the second public land mobile network.

In some embodiments, the method further comprises receiving information indicating a security key mismatch detected by the user equipment and setting a parameter to a value indicating a potential security issue in response to receiving the information indicating the security key mismatch detected by the user equipment.

In various embodiments, an apparatus comprising a transmitter, a processor, and a receiver that receives an authentication request message corresponding to a user equipment. In response to receiving the authentication request message. The processor determines whether the user equipment has moved from a first public land mobile network to a second public land mobile network within a predetermined period of time. The processor, in response to the user equipment having moved from the first public land mobile network to the second public land mobile network within the predetermined period of time, determines a likelihood factor that indicates a likelihood that the user equipment moved from the first public land mobile network to the second public land mobile network. The transmitter, in response to the likelihood factor being less than a predetermined threshold, transmits an authentication response message indicating a failed authentication.

In some embodiments, the likelihood factor corresponds to a distance between the first public land mobile network and the second public land mobile network taking into account the predetermined period of time between two registrations corresponding to the first public land mobile network and the second public land mobile network.

In some embodiments, the receiver receives information indicating a security key mismatch detected by the user equipment, and the processor sets a parameter to a value indicating a potential security issue in response to the receiver receiving the information indicating the security key mismatch detected by the user equipment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network function, the method comprising:
   receiving, from an access and mobility management function (AMF), an authentication request message corresponding to a user equipment (UE);
   in response to receiving the authentication request message, determining whether the UE moved from a first public land mobile network (PLMN) to a second PLMN within a time period, wherein a first PLMN identifier (ID) indicating the first PLMN is different from a second PLMN ID indicating the second PLMN;
   in response to determining the UE moving from the first PLMN to the second PLMN, determining a factor that indicates a likelihood that the UE moved from the first PLMN to the second PLMN; and
   in response to the factor satisfying a threshold, transmitting, to the AMF, an authentication response message indicating a failed authentication.

2. The method of claim 1, wherein the factor corresponds to a distance between the first PLMN and the second PLMN including the time period between two registrations corresponding to the first PLMN and the second PLMN.

3. The method of claim 1, further comprising:
   receiving UE information indicating a security key mismatch; and
   setting a parameter to a value indicating a potential security issue in response to receiving the UE information indicating the security key mismatch.

4. An apparatus of a network function, the apparatus comprising:
   at least one memory; and
   at least one processor coupled with the at least one memory and configured to cause the apparatus to:
   receive, from an access and mobility management function (AMF), an authentication request message corresponding to a user equipment (UE);
   in response to receiving the authentication request message, determine whether the UE moved from a first public land mobile network (PLMN) to a second PLMN within a time period, wherein a first PLMN identifier (ID) indicating the first PLMN is different from a second PLMN ID indicating the second PLMN;
   in response to determining the UE moving from the first PLMN to the second PLMN, determine a factor that indicates a likelihood that the UE moved from the first PLMN to the second PLMN; and
   in response to the factor satisfying a threshold, transmit, to the AMF, an authentication response message indicating a failed authentication.

5. The apparatus of claim 4, wherein the factor corresponds to a distance between the first PLMN and the second PLMN including the time period between two registrations corresponding to the first PLMN and the second PLMN.

6. The apparatus of claim 4, wherein the at least one processor is configured to cause the apparatus to:
   receive UE information indicating a security key mismatch; and
   set a parameter to a value indicating a potential security issue in response to receiving the UE information indicating the security key mismatch.

7. A processor of a network function, comprising:
   at least one controller coupled with at least one memory and configured to cause the processor to:
   receive, from an access and mobility management function (AMF), an authentication request message corresponding to a user equipment (UE);
   in response to receiving the authentication request message, determine whether the UE moved from a first public land mobile network (PLMN) to a second PLMN within a time period, wherein a first PLMN identifier (ID) indicating the first PLMN is different from a second PLMN ID indicating the second PLMN;
   in response to determining the UE moving from the first PLMN to the second PLMN, determine a factor that indicates a likelihood that the UE moved from the first PLMN to the second PLMN; and
   in response to the factor satisfying a threshold, transmit, to the AMF, an authentication response message indicating a failed authentication.

8. The processor of claim 7, wherein the factor corresponds to a distance between the first PLMN and the second PLMN including the time period between two registrations corresponding to the first PLMN and the second PLMN.

9. The processor of claim 7, wherein the at least one controller is configured to cause the processor to:
   receive UE information indicating a security key mismatch; and set a parameter to a value indicating a potential security issue in response to receiving the UE information indicating the security key mismatch.

10. An apparatus of a network function, comprising:
means for receiving, from an access and mobility management function (AMF), an authentication request message corresponding to a user equipment (UE);
means for, in response to receiving the authentication request message, determining whether the UE moved from a first public land mobile network (PLMN) to a second PLMN within a time period, wherein a first PLMN identifier (ID) indicating the first PLMN is different from a second PLMN ID indicating the second PLMN;
means for, in response to determining the UE moving from the first PLMN to the second PLMN, determining a factor that indicates a likelihood that the UE moved from the first PLMN to the second PLMN; and
means for, in response to the factor satisfying a threshold, transmitting, to the AMF, an authentication response message indicating a failed authentication.

11. The apparatus of claim 10, wherein the factor corresponds to a distance between the first PLMN and the second PLMN including the time period between two registrations corresponding to the first PLMN and the second PLMN.

12. The apparatus of claim 10, further comprising means for:
receiving UE information indicating a security key mismatch; and
setting a parameter to a value indicating a potential security issue in response to receiving the UE information indicating the security key mismatch.

* * * * *